March 18, 1952          J. J. BRAUND          2,589,923
APPARATUS FOR CHARTING GEOGRAPHICAL PROFILES
Filed Oct. 11, 1945          3 Sheets-Sheet 1
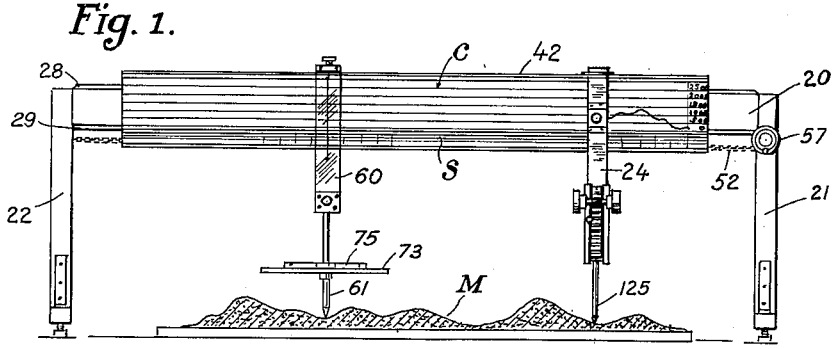
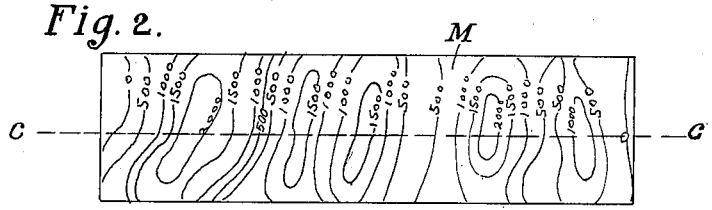
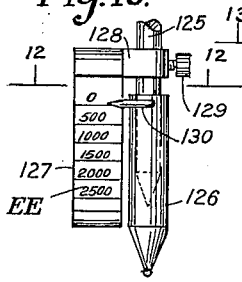 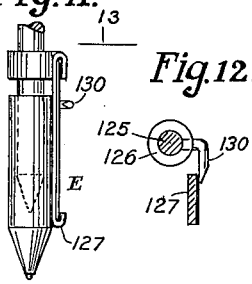 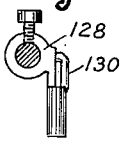
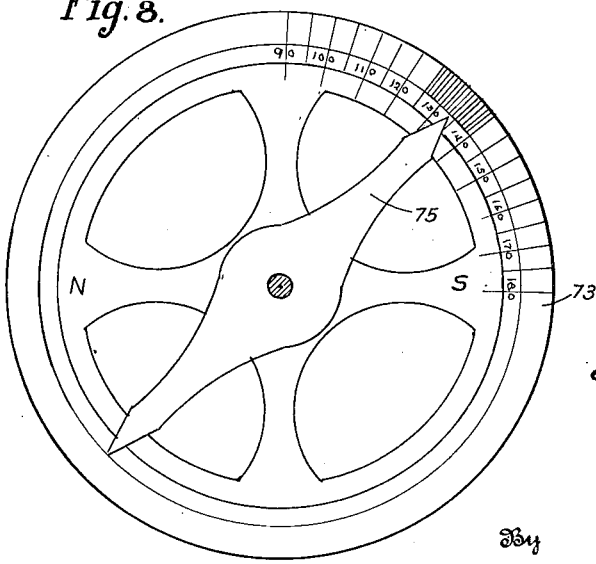
John J. Braund
Inventor
By Parry + Miller
Attorneys

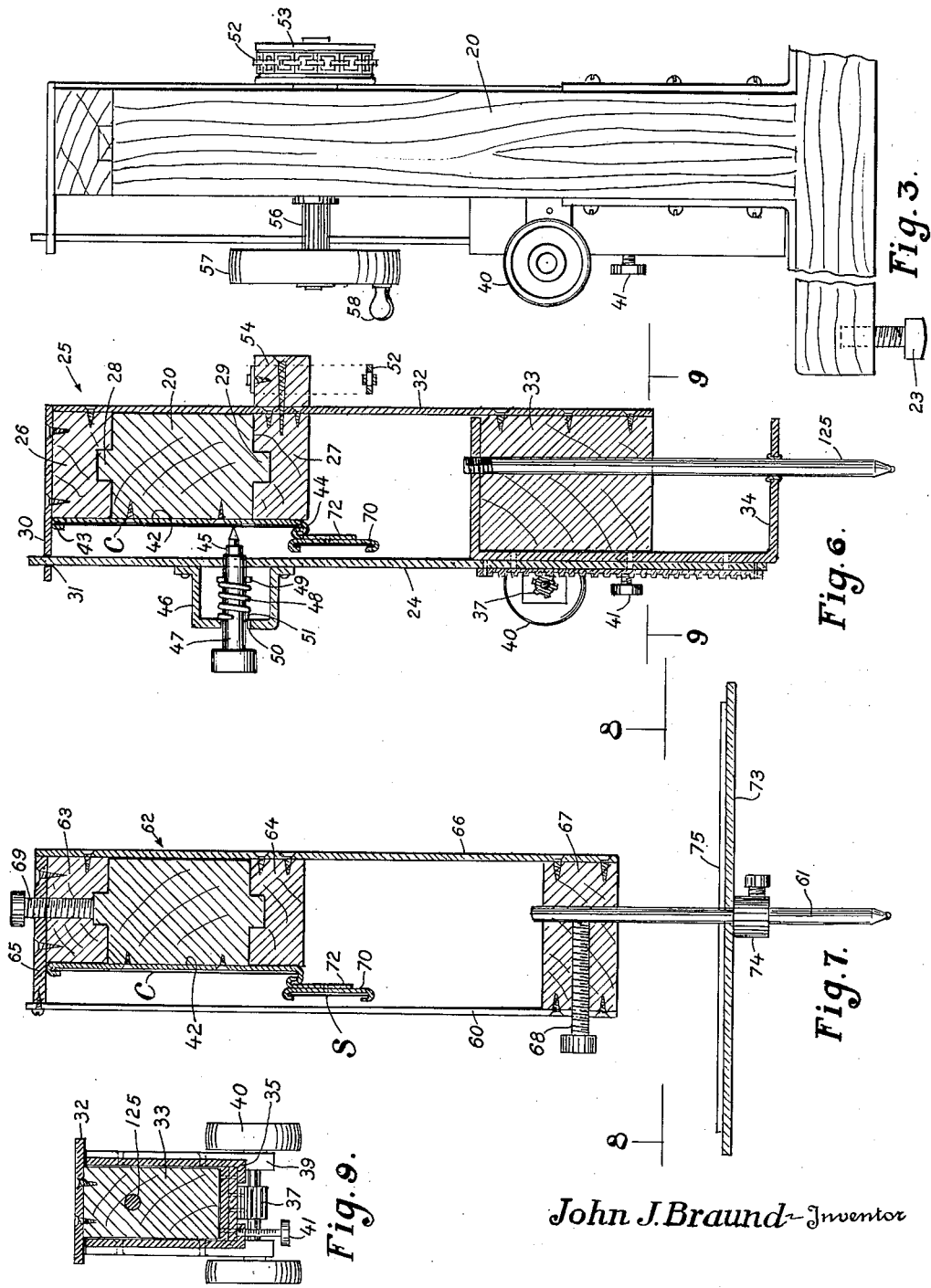

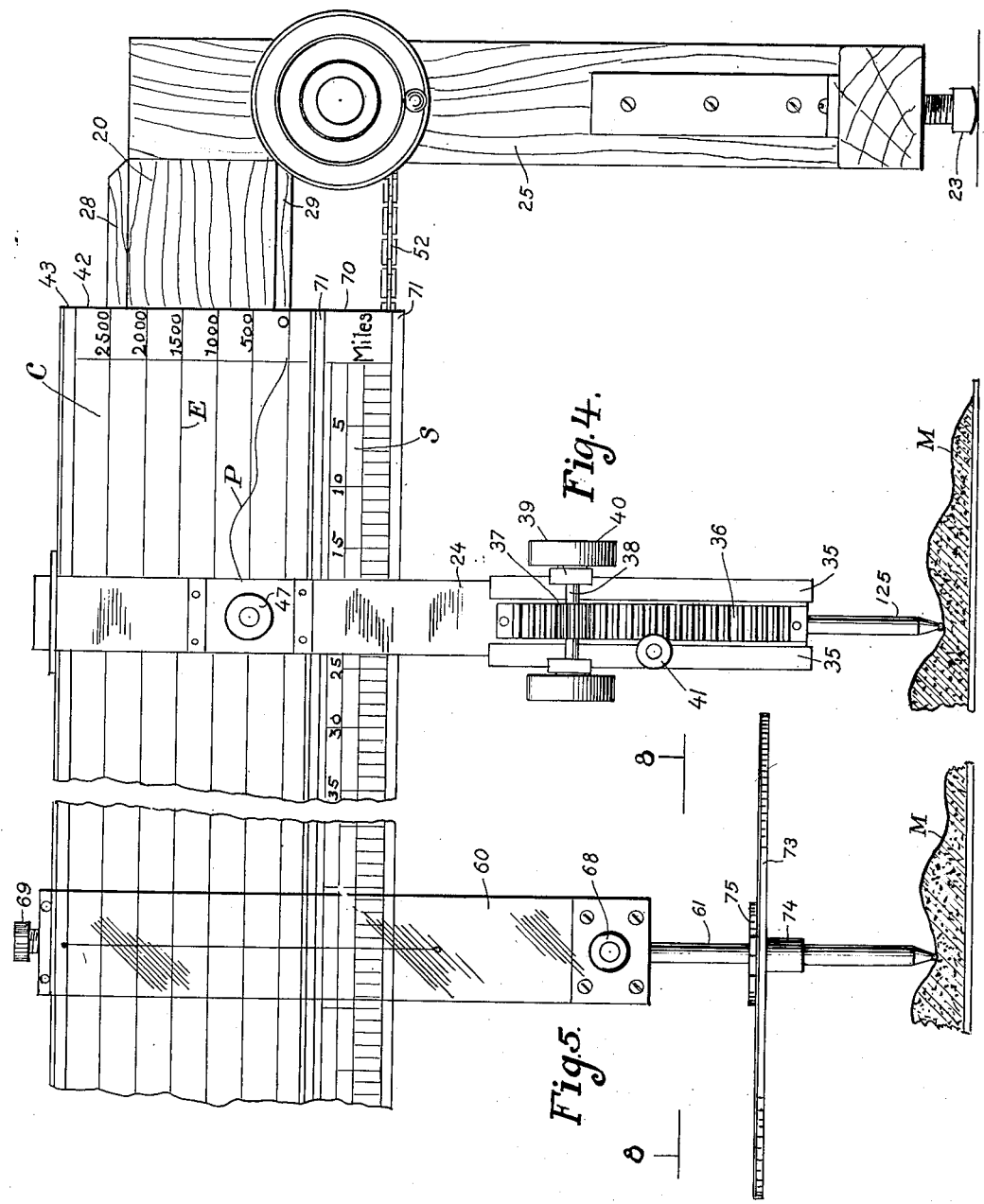

Patented Mar. 18, 1952

2,589,923

UNITED STATES PATENT OFFICE 2,589,923

APPARATUS FOR CHARTING GEOGRAPHICAL PROFILE

John J. Braund, Washington, D. C.

Application October 11, 1945, Serial No. 621,707

10 Claims. (Cl. 33—23)

This invention is directed to the charting of geographical profile with the aid of topographical maps, and has for its general object the production of profile charts showing elevation and contour along a selected course between spaced geographical points.

Geographical profile charts are of great value as flight course guides for aircraft pilots. They have further utility, however, for other purposes, such as aiding in the planning of suitable courses for pipe lines, power lines, railroads, etc. The production of such charts has heretofore been a laborious matter. In some cases the charts have been manually plotted from topographical maps and did not provide as accurate profile as desirable as well as being time consuming. In other cases, profile charts were produced by cutting a relief map along a desired course and reproducing the profile along the cut, ruining the relief map for further use.

The present invention enables the production of profile charts from topographical maps rapidly and accurately along any selected straight or irregular course without injury to the topographical map employed. While best results are obtained with the aid of relief maps the invention does not depend thereon and permits profile charts to be made with the aid of flat topographical maps whereon elevation and contour is portrayed.

According to the invention profile charts are produced by moving a contact element along a selected course on a topographical map, simultaneously moving a scriber along a chart strip aligned with the course on the map and progressively adjusting the elevation of the scriber to conform to the elevation and contour in conformity with the map characteristics along the course traced by the map-contacting element. When relief maps are employed the map-contacting element may be caused to directly adjust the elevation of the scriber. When employing flat topographical maps the scriber is varied in elevation independently of the map-contacting element.

It is the purpose of the invention not only to produce profile charts showing contour, but to enable the determination and representation on the charts of appropriate information such as mileage, direction, scaled elevation, and position and direction of off-course landmarks.

Novel apparatus for accomplishing the purpose of the invention may be made in a relatively simple form and at low manufacturing cost for use with topographical maps of varied linear and elevational scales.

The invention will be more fully understood by reference to the accompanying drawings of an illustrative embodiment of the inventive apparatus and the subsequent description thereof.

In such drawings:

Fig. 1 is a longitudinal elevation of a geographical profile producing apparatus according to the invention in operative relation with a relief map;

Fig. 2 is a plan view of the relief map shown in Fig. 1;

Fig. 3 is an enlarged end elevation taken at the right of Fig. 1;

Fig. 4 is an enlarged fragmentary front elevation showing details of the portion of the apparatus at the right end of Fig. 1;

Fig. 5 is a corresponding front elevation at an intermediate portion of the apparatus;

Fig. 6 is a transverse section of the part shown in Fig. 4;

Fig. 7 is a transverse section of the part shown in Fig. 5;

Fig. 8 is a view taken on line 8—8 of Fig. 5 showing the direction determining device;

Fig. 9 is a cross-section taken at line 9—9 of Fig. 6;

Figs. 10 and 11 are elevational views at right angles to each other of an auxiliary device used when the apparatus is employed with flat topographical maps; and Figs. 12 and 13 are cross-sectional views taken respectively at line 12—12 of Fig. 10 and line 13—13 of Fig. 11.

Referring now to the drawings, my geographical profile making apparatus includes an elongated straight frame member 20 supported at its opposite ends by legs 21 and 22. The frame member should preferably be four feet or more long so as to accommodate between the spaced legs any of the more conventional sizes of topographical maps employed for course-determining purposes.

As best shown in Fig. 3 the supporting legs are provided with vertically adjustable bottom elements 23 to permit the apparatus to be aligned both vertically and horizontally on the surface, such as the table. Inasmuch as relief maps and their supporting bases vary in thickness adjusting elements 23 will also serve to enable frame member 20 to be adjusted to the correct vertical spacing from maps.

Slidable lengthwise of frame member 20 is a vertical arm member 24 supporting a ball point map-engaging element 125. Arm member 24 is mounted on a carriage 25 having upper and lower portions 26 and 27 engageable with upper and lower rails 28 and 29 on the frame member, all as shown in Fig. 6. Carriage 25 supports arm 24 for independent vertical movement. At the top of the carriage is a guide plate 30 having an aperture 31 in which the upper end of arm 24 is slidable. Depending from the rear of the carriage is a vertical support 32 to which is secured a bearing block 33 having a bore in which the map-engaging element 125 is slidable. Element 125 is fixed to a U-shaped bracket 34 mounted on arm 24. Bracket 34 is secured rigidly to arm 24 by suitable screws or other fastening elements.

For reasons which will hereafter become apparent it is desirable that arm 24 be capable of vertical movement in response to vertical movement of map-engaging element 125, and also be adjustable on carriage 25 to different fixed vertical positions. To provide for such vertical adjustment block 33 of the carriage is provided with opposite side plates having front flanges 35, seen in Fig. 4 slidably embracing arm 24. Secured to the arm between the flanges is a rack 36 with which coacts a gear 37 supported by a shaft 38 mounted in journal blocks 39 on flanges 35 of the carriage. Through knobs 40 gear 37 may be rotated to raise and lower arm 24 and map-engaging element 125 to different adjusted positions relative to carriage 25. Threaded in one of the flanges 35 is a locking screw 41 which may be set to frictionally engage the underlying portion of arm 24 and hold the arm in fixed vertically adjusted position relative to the carriage.

Secured to the front or frame member 20 and extending longitudinally thereof is an upstanding chart strip holder 42 having top and bottom flanges 43 and 44 for supporting a chart strip C in the holder. Mounted on the longitudinally and vertically movable arm 24 is a horizontal scribing element 45 for drawing profile lines on a chart strip. Bracket 46 is secured to the arm 24 and has an aperture in alignment with a corresponding aperture in the arm to slidably support a tubular holder 47 in which scribing element 45 is mounted. Spring 48 is interposed between bracket 46 and pin 49 on the holder to yieldingly hold scribing element 45 in engagement with chart C. Adjoining the holder-receiving bore of bracket 46 is a groove 50 through which pin 51 on holder 47 may be drawn, and then the holder turns slightly so that pin 51 rests on the outer side of bracket 46, thereby to secure scriber 45 in inoperative position relative to the chart strip C.

Since arm 24 is subject to vertical movement as the carriage 25 moves lengthwise of the frame 20, and likewise because of the length of the frame, means are provided for propelling the carriage. Such means here takes the form of a traveling chain 52 mounted on sprockets 53 journaled for rotation at the opposite ends of the frame. The opposite ends of the chain are anchored to securing means such as block 54 fastened on the rear side of carriage 25. Supporting shaft 56 at the right end of the frame has secured thereto at the front side of the frame an actuating wheel 57 carrying a handle 58. Through such handled operating wheel chain 52 may be actuated in both directions to move cariage 25 together with arm 24 and map-engaging element 125 lengthwise of the frame.

In order to correctly align frame 20 with a selected course CC on map M whose profile is to be charted a second depending arm 60 is mounted on frame 20 carrying a map contacting element 61 similar to element 125. Preferably such arm is adjustably mounted for lengthwise movement on frame 20. To this end, the carriage 62 is mounted on the frame having rail-engaging upper and lower portions 63 and 64, a forwardly extending top plate 65 to which the upper end of arm 60 is secured, and a depending back plate 66 mounting at its lower end block 67 to the front of which the lower end of arm 60 is secured. Block 67 is bored to receive a map-engaging element 61 in such position that map-contacting elements 61 and 125 lie in a common vertical plane parallel with frame 20. Element 61 is vertically adjustable in block 67 so that it may be brought into contact with a map of any thickness. A set screw 68 is threaded in the front side of block 67 for locking map-engaging element 61 in any desired vertical position. A second set screw 69 is threaded to the upper plate 65 and rail-engaging portion 63 of carriage 62 so that the carriage with arm 60 and element 61 may be secured in any lengthwise adjusted position on frame 20.

Since arm 60 overlies the front side of chart holder 42 it is preferably made of transparent plastic material and provided with a vertical hairline which is in exact vertical alignment with map-engaging element 61.

A mileage scale holder 70 is supported at the front of the frame adjacent chart strip holder 42, the same having upper and lower receiving flanges 71 in which different mileage scales S conforming to the scales of different maps employed may be slidably mounted. Conveniently holder 70 may be provided at its back with a flanged element 72 adapted to engage with lower flange 44 of chart holder 42. With such arrangement the mileage scale holder is made readily demountable, and when in operative position flanged element 72 will frictionally engage the lower margin of chart strip C and hold the same against accidental displacement during operation of the apparatus.

In order that the direction of a selected course whose profile is to be charted may be determined a protractor or compass rose 73 such as shown in Fig. 8 is mounted on one of the map-engaging elements. Here the protractor is mounted on map-engaging element 61 which remains stationary during operation of the apparatus. A collar 74 mounts protractor 73 on element 61 for free rotation so that the same may be adjusted to bring its north-south line into parallelism with the corresponding direction line on any map regardless of the selected course on the map to be charted. Coactive with protractor 73 and rotatable independently thereof is a pointer arm 75 by which the direction of the course to be charted or any other direction may be quickly determined.

Assuming that the apparatus is to be employed to produce a profile chart with the aid of a relief map M such as shown, the map is positioned beneath frame 20 and the vertical and horizontal alignment of frame 20 with the map is checked, adjusting raising and lowering elements 23 on legs 21 and 22 if necessary. At this time carriage 25 will be located at the right end of chart strip holder 42 with map-engaging element 125 in registry with the zero point of mileage scale S. By sliding either or both the map and the frame the geographical point on the map from which the profile chart is to start is brought into registry with map-engaging element 125. Assuming that chart strip C has previously been ruled with parallel elevation lines E conforming to the elevation scale of the map elements 23 may be adjusted to bring the vertical position of the lower end of map-engaging element 125 and scriber 45 into conformity with the elevation scale. This may be done most accurately by adjusting carriage 25 lengthwise of the frame to bring map-engaging element 125 to position on one of the elevation lines such as are provided on the map as indicated in Fig. 2. Carriage 25 is then brought to zero set position with element 125 in contact with the starting geographical point on the map as already explained.

Frame 20 and map M are now swung horizontally relative to each other with element 125 as a pivot until map-engaging elements 125 and 61 are aligned with the selected course on the map to be charted. At the start carriage 62 and map-engaging element 61 will be at the left end of the frame out of the way, but during the aligning operation carriage 62 will be moved to the right to bring element 61 into registry with a second geographical point on the source to be charted. With the alignment apparently obtained element 61, which previously will have been located in raised position by set screw 68 can be lowered onto the second geographical point on the map and any further aligning adjustment made if required.

At this time it is desirable to mark on the chart strip C with the hairline on arm 60 as a guide a suitable line indicating the end point of the profile chart to be drawn as determined by map-engaging element 61. It is also desirable at this stage to determine the course direction by adjusting protractor 73 to conform to the direction of the map and bringing pointer 75 into alignment with the common plane of elements 61 and 125. A notation of this direction may then be put at a convenient point on the chart strip. Carriage 62 is then moved to the left out of the way and the profile of the selected course is then drawn on chart C by operating wheel 57 to cause chain 52 to move carriage 25 to the left from its zero position until it reaches the terminal mark previously placed on the chart strip. During this movement map-engaging element 125 makes bearing contact with the map, raising and lowering itself and, through arm 24, scriber 45 in accordance with the changing contour of the map so that the scriber will accurately trace a profile line P conforming exactly to the profile along course CC of the map.

While course CC has here been shown as a straight line course, it will be understood that the profile of an irregular course may also be plotted. In the latter case the first leg of the course on the map will be aligned with the map-contacting elements 125 and 61 and the profile thereof plotted. Thereafter with element 125 at the terminal point of the first leg the map and apparatus will be relatively turned until the second leg is aligned with elements 125 and 61, following which the profile of the second leg of the course can be drawn. The direction of the respective legs can be determined with the aid of protractor 73 and pointer 75 and noted on chart C.

Particularly where profile charts are to be employed as aircraft navigational aids it is desirable to apply to the charts various additional types of information supplementing the course elevational profile and elevation lines. With the mileage scale S as a guide the mileage along the profile may be applied to the chart, giving particular attention to peaks or other high points of the profile. With the aid of the protractor the location of off-course landmarks can be determined and noted on the chart to assist the pilot in determining whether he is actually following the correct course. The exact location on the chart strip corresponding to any particular geographical point on the map may readily be checked after the profile line has been drawn by bringing element 61 into contact with the map point and marking the point on the profile line with the aid of the hairline on transparent arm 60.

The elevation scale lines E on chart C may be produced by the apparatus either before or after elevational profile line P is drawn. With holder 47 and scriber 45 in retracted position clear of chart C carriage 25 is moved lengthwise along the frame until contact element 125 lies over one of the elevation lines on map M. It is then lowered into contact with the line by vertical adjusting wheel 40 and set screw 41 is tightened to lock arm 24 against vertical movement. If necessary map M may temporarily be removed. Then carriage 25 is propelled along the frame so that scriber 45 draws the first elevation line E on the chart. Set screw 41 is then released and contact element 125 is brought to position and contact with an elevation line representing another height on the map, resulting in vertical adjustment of scriber 45 relative to chart C. The arm is again locked, first removing the map if necessary, and the corresponding second elevation line E is drawn on the chart. This process may be repeated as many times as necessary to provide an elevation scale on the chart against which profile line P may be read.

While the apparatus is primarily designed for making profile charts from relief maps charts may also be made with the aid of flat topographical maps. In such case elevation scale lines E are first drawn on the chart according to the elevation scale indicated on the map, marking off a series of points representing the different elevation lines with the aid of a ruler and then successfully ruling the elevation lines with scriber 45 and arm 24 correctly adjusted for each line in the manner just above explained. It is immaterial whether the topographical map is or is not in position during the drawing of the elevation lines, since it is flat and will not cause the map-engaging element 125 to vertically adjust the scriber. With the selected course on the map whose profile is to be charted now adjusted to alignment with the vertical plane of map-contacting elements 125 and 61 arm 24 which will be at the right end of frame 20 is then adjusted until contact element 125 lies over the first elevation line on the map. At this time the scriber will be in retracted position. Arm 24 is then vertically adjusted through wheel 40 until scriber 45 is at the correct vertical height as shown by the elevation scale previously drawn on the chart. The scriber is then released to operative position to place an elevation mark on the chart in vertical alignment with the elevation line on the map. This process is progressively repeated by moving the vertical arm on its carriage to alignment with successive elevation lines on the map intersecting the selected course to be profiled. The various elevation points may then be joined by slowly moving the arm on its carriage along the frame and gradually vertically adjusting arm 24 through wheel 40 during the course of travel to connect the various elevation marks. Alternately the chart may be removed from the chart holder and the profile line drawn manually.

In lieu of the procedure for drawing profile charts with topographical maps just described a somewhat similar procedure may be followed employing an auxiliary device in conjunction with elements 125. Such auxiliary device is shown in Figs. 10 through 13 and consists of an auxiliary map-engaging element 126 having a ball point at its lower end and bored to slidably engage the lower portion of the usual map-engaging element 125. An elevation scale holder 127 is mounted on the collar 128 and secured through set screw 129 to element 125 so as to lie opposite auxiliary contact element 126. Holder 127 is flanged at top and bottom to receive an elevation scale EE calibrated to the elevation scale of the map. Mounted on element 126 is a coacting pointer 130.

With the auxiliary scale device just described arm 24 may be moved along the predetermined course on the map with auxiliary contact element 126 in rolling contact with the map. As each elevation line on the map intersecting the course is reached arm 24 may be adjusted vertically through wheel 40 to the correct elevation indicated by pointer 130 and scale EE. Either separate points may be marked on the chart by scriber 45 or by gradually varying the elevation of arm 24 by wheel 40 as the arm is moved lengthwise slowly on its carriage a continuous profile line can be drawn. Through the auxiliary scale device parallel elevation scale lines may also be drawn on the chart.

It will be understood that the inventive method of producing geographical profile charts essentially involves aligning a chart strip vertically and horizontally relative to a selected course on a map to be charted, simultaneously following the course on the map and a corresponding course with a scriber on the chart, and varying the elevation of the scriber on the chart to correspond to the elevation represented on the map. It is important, of course, that the scriber be maintained at all times in vertical alignment with the correct points along the course on the map so that the profile will not be distorted. For this reason it is desirable that the method be carried out by apparatus such as herein described wherein the map following element and a scriber are rigidly mounted against tilting movement relative to each other and against tilting movement of their supporting carriage relative to the frame along which they are slidable.

With further reference to the apparatus, it will be seen from the illustrative embodiment that the same may be constructed in a simple form. The same is relatively light and readily portable. Of course it is important that there be no lost motion between coacting cooperative parts, since such type defects, in view of the fact that maps are made to a relatively small scale, might result in errors in the chart profile line of hundreds of feet in elevation and many miles offset of points on the profile line from their correct position.

It will be understood that the apparatus of the invention may be constructed in a variety of forms with considerable variation from the embodiment herein shown and described. Accordingly, the scope of the apparatus, also the method are to be determined in accordance with the appended claims.

I claim:

1. Apparatus for charting geographical elevational profile for use with flat topographical maps comprising an elongated straight frame, spaced apart supports for mounting the frame over a topographical map, an upright chart strip holder mounted upon and extending lengthwise of the frame, a scriber for drawing a profile line on a chart in the holder, a carriage movable lengthwise on the frame, a vertical arm supporting the scriber mounted on the carriage for lengthwise movement therewith and vertical movement independently therefrom, a map-engaging element mounted on the lower end of the vertical arm adapted to trace a selected path on the map under lengthwise movement of the carriage and determine from the contour represented on the map the correct vertical position of the arm and the scriber at progressive portions of the profile line inscribed on the chart strip, and wherein the vertical arm is movable vertically on the carriage independently of the map-engaging element, and includes means for adjusting the vertical arm and scriber and means for determining the proper vertical adjustment thereof, said latter means including an elevation scale and an indicator cooperative therewith mounted one on the vertical arm and the other on the map-engaging element by which the correct vertical position of the arm and scriber may be determined at points of intersection of the path of the map-engaging element with elevation lines on the map.

2. Apparatus for charting geographical elevational profile comprising an elongated straight frame, spaced apart supports for mounting the frame over a topographical map, an upright chart strip holder mounted upon and extending lengthwise of the frame, a scriber for drawing a profile line on a chart in the holder, a carriage movable lengthwise on the frame, a vertical arm supporting the scriber mounted on the carriage for lengthwise movement therewith and vertical movement independently therefrom, a map-engaging element mounted on the lower end of the vertical arm adapted to trace a selected path on the map under lengthwise movement of the carriage and determine from the contour represented on the map the correct vertical position of the arm and the scriber at progressive portions of the profile line inscribed on the chart strip, and wherein the chart strip holder has a longitudinally extending chart strip retaining flange, and further including a mileage scale holder having mounting means detachably engageable with said flange on the chart strip holder.

3. Apparatus for charting geographical elevational profile comprising an elongated straight frame, spaced apart supports for mounting the frame over a topographical map, an upright chart strip holder mounted on and extending lengthwise of the frame, a pair of vertical arms located in a common vertical plane and depending from the frame having map-engaging elements on their lower ends, carriage means mounting one of said vertical arms for movement lengthwise and vertically relative to the frame and chart strip holder, and a scriber mounted on said vertically movable arm for operative engagement with a chart strip in said holder.

4. Apparatus for charting geographical elevational profile comprising an elongated straight frame, spaced apart supports for mounting the frame over a topographical map, an upright chart strip holder mounted on and extending lengthwise of the frame, a pair of vertical arms, means mounting said arms located in a common vertical plane and for independent lengthwise movement on the frame, and one of said means mounting its arm for vertical movement relative to the frame and chart strip holder, map-engaging elements mounted on the lower ends of the respective arms, and a scriber mounted on the vertically movable arm for operative engagement with a chart strip in said holder.

5. Apparatus for charting geographical elevational profile comprising an elongated straight frame, spaced apart supports for mounting the frame over a topographical map, an upright chart strip holder mounted on and extending lengthwise of the frame, a pair of carriages mounted for independent sliding movement lengthwise of the frame, a depending arm mounted on one of said carriages, a map-engaging element carried by said arm, a second arm mounted in a common vertical plane with said first arm for vertical movement on the other carriage, a second map-engaging element carried by and movable as a unit with the second arm, and a scriber mounted on the vertically movable arm for operative engagement with a chart strip in said holder.

6. Apparatus for charting geographical profile according to claim 5 further including coactive actuating means on the second carriage and second arm for vertically adusting the elevation of the arm and scriber relative to the chart strip holder.

7. Apparatus for charting geographical profile according to claim 5 wherein the first map-engaging element is mounted by its supporting arm for vertical adjustment relative to the first carriage.

8. Apparatus for charting geographical profile comprising a straight elongated horizontal frame, spaced legs secured to the frame adapted to support the frame over a map, an upright chart holder extending lengthwise of the frame, a pair of vertical members located in the common vertical plane having map-engaging lower ends, a scriber mounted on one of said vertical members for operative engagement with a chart in the chart holder, means mounting said scriber carrying vertical member on the frame for movement lengthwise and vertically of the frame and chart holder, and means mounting the other vertical member on the frame for adjusting movement in the plane of movement of the scriber carrying vertical member.

9. Apparatus for charting geographical profile comprising an elongated straight horizontal frame, spaced legs secured to the frame adapted to support the frame over a map, an upright chart holder extending lengthwise of the frame, a scriber cooperative with a chart in the holder, means mounting the scriber on the frame for movement lengthwise and vertically relative to the chart holder and carrying a map-engaging element movable in a straight path relative to a map, a compass rose and cooperative pointer, and means supported by the frame mounting the compass rose and pointer for pivotal movement about their central axis and with their central axis located in a common vertical plane with the path of movement of the map-engaging element.

10. Apparatus for charting geographical profile comprising an elongated straight frame, spaced legs secured to the frame adapted to support the frame over a map, an upright chart holder extending lengthwise of the frame, a mileage scale holder extending lengthwise of the frame and mounted adjacent the chart scale holder, a scriber cooperative with a chart in the chart holder, a carriage mounted for lengthwise movement along the frame, a scriber supporting member mounted on the carriage for vertical movement and carrying a map-engaging element movable in a straight path when the carriage move lengthwise of the frame, means for aligning the path of movement of the map-engaging element with a selected course on a map employed in charting profile, and means centered in a common vertical plane with the path of movement of the map-engaging element for indicating the compass direction relative to the map of the path of movement of the map-engaging element and the geographical profile being charted.

JOHN J. BRAUND.

REFERENCES CITED

The following references are of record in the file of this patent:

UNITED STATES PATENTS

| Number | Name | Date |
|---|---|---|
| 37,650 | Van Horn | Feb. 10, 1863 |
| 1,108,034 | Wainwright | Aug. 18, 1914 |
| 1,240,525 | Woodward | Sept. 18, 1917 |
| 1,271,461 | Hanna | July 2, 1918 |
| 1,317,425 | Bryce | Sept. 30, 1919 |
| 1,510,819 | Barth | Oct. 7, 1924 |
| 1,577,569 | Donley | Mar. 23, 1926 |
| 1,716,279 | Owen | June 4, 1929 |
| 2,067,387 | Gadd et al. | Jan. 12, 1937 |
| 2,136,134 | Holley | Nov. 8, 1938 |
| 2,305,167 | Kasper | Dec. 15, 1942 |

OTHER REFERENCES

FM 21-26, paragraph 57 (pages 77-79), "Advanced Map and Aerial Photograph Reading." War Dept., September 17, 1941.